United States Patent
Hepler et al.

(10) Patent No.: US 8,699,434 B2
(45) Date of Patent: *Apr. 15, 2014

(54) PROTOCOL ENGINE FOR PROCESSING DATA IN A WIRELESS TRANSMIT/RECEIVE UNIT

(75) Inventors: Edward L. Hepler, Malvern, PA (US); Robert G. Gazda, Spring City, PA (US); Alexander Reznick, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/086,630

(22) Filed: Apr. 14, 2011

(65) Prior Publication Data

US 2011/0191532 A1   Aug. 4, 2011

Related U.S. Application Data

(63) Continuation of application No. 11/474,718, filed on Jun. 26, 2006, now Pat. No. 7,929,410.

(60) Provisional application No. 60/694,969, filed on Jun. 29, 2005.

(51) Int. Cl.
*H04W 4/00*   (2009.01)

(52) U.S. Cl.
USPC ............................ 370/329; 370/342; 711/165

(58) Field of Classification Search
USPC ................. 370/235–238, 278–281, 328–338, 370/349–350, 390–427
See application file for complete search history.

(56) References Cited

U.S. PATENT DOCUMENTS

| | | | |
|---|---|---|---|
| 4,156,796 A | 5/1979 | O'Neal et al. | |
| 6,178,176 B1 | 1/2001 | Voloshin et al. | |
| 6,356,999 B1 | 3/2002 | Cashman et al. | |
| 6,788,652 B1 | 9/2004 | Hwang | |
| 6,791,963 B1 | 9/2004 | Hwang et al. | |

(Continued)

FOREIGN PATENT DOCUMENTS

| | | |
|---|---|---|
| KR | 2002-81840 | 10/2002 |
| WO | 99/39523 | 8/1999 |
| WO | 03/053084 | 6/2003 |

OTHER PUBLICATIONS

NTP e-Newsletters, vol. 62 (Oct. 2004).

*Primary Examiner* — Ricky Ngo
*Assistant Examiner* — Iqbal Zaidi
(74) *Attorney, Agent, or Firm* — Volpe And Koenig, P.C.

(57) ABSTRACT

A protocol engine (PE) for processing data within a protocol stack in a wireless transmit/receive unit (WTRU) is disclosed. The protocol stack executes decision and control operations. The data processing and re-formatting which was performed in a conventional protocol stack is removed from the protocol stack and performed by the PE. The protocol stack issues a control word for processing data and the PE processes the data based on the control word. Preferably, the WTRU includes a shared memory and a second memory. The shared memory is used as a data block place holder to transfer the data amongst processing entities. For transmit processing, the PE retrieves source data from the second memory and processes the data while moving the data to the shared memory based on the control word. For receive processing, the PE retrieves received data from the shared memory and processes it while moving the data to the second memory.

18 Claims, 8 Drawing Sheets

(56) References Cited

U.S. PATENT DOCUMENTS

| | | |
|---|---|---|
| 6,996,126 B2 | 2/2006 | Deml et al. |
| 7,729,349 B2 * | 6/2010 | Beckmann et al. ........... 370/390 |
| 2002/0045435 A1 * | 4/2002 | Fantaske ....................... 455/403 |
| 2003/0007517 A1 * | 1/2003 | Beckmann et al. ........... 370/537 |
| 2003/0043848 A1 | 3/2003 | Sonksen |
| 2003/0200439 A1 | 10/2003 | Moskowitz |
| 2004/0014447 A1 | 1/2004 | Hepler et al. |
| 2004/0208177 A1 | 10/2004 | Ogawa |
| 2005/0025182 A1 | 2/2005 | Nazari |
| 2005/0036513 A1 | 2/2005 | Clarke |
| 2005/0083917 A1 | 4/2005 | Okamoto et al. |
| 2005/0147040 A1 * | 7/2005 | Vayanos et al. ............... 370/235 |
| 2005/0174985 A1 * | 8/2005 | Lee et al. ...................... 370/349 |
| 2006/0211447 A1 | 9/2006 | Purkayastha et al. |
| 2007/0060142 A1 | 3/2007 | Reznik et al. |

* cited by examiner

PROTOCOL ENGINE FOR PROCESSING DATA IN A WIRELESS TRANSMIT/RECEIVE UNIT

CROSS REFERENCE TO RELATED APPLICATION

This application is a continuation of U.S. patent application Ser. No. 11/474,718, filed on Jun. 26, 2006, which claims the benefit of U.S. provisional application No. 60/694,969 filed Jun. 29, 2005, which is incorporated by reference as if fully set forth.

FIELD OF INVENTION

The present invention is related to processing data in a wireless transmit/receive unit (WTRU), (i.e., a mobile station). More particularly, the present invention is related to a protocol engine (PE) for processing data in a WTRU.

BACKGROUND

A protocol stack in a wireless communication system, such as a universal mobile telecommunications system (UMTS) frequency division duplex (FDD) system, is a collection of inter-related system components. The protocol stack takes data, (application data or network data), re-formats and packetizes it for transmission over an air interface, and re-builds the data on the receive side of the air interface. The protocol stack is also responsible for control, configuration and maintenance of air interface parameters. For example, the protocol stack controls the parameters related to data rate, physical channel configuration, timing, in-sequence delivery of data, and the like.

As an example, the access stratum (AS) portion 100 of the UMTS FDD protocol stack is shown in FIG. 1. As shown in FIG. 1, the UMTS AS 100 includes radio resource control (RRC) 102, radio access bearer management (RABM)/packet data convergence protocol (PDCP) 104, broadcast/multicast control (BMC) 106, radio link control (RLC) 108 and medium access control (MAC) 110.

The RRC 102 performs initial cell selection and reselection (mobility), establishment, maintenance and release of RRC (signaling) connections with the UMTS terrestrial radio access network (UTRAN), establishment, maintenance and release of radio bearers, transport channels (TrCH) and physical channels, (i.e. configuration of the WTRU Layer 2 and Layer 1 based on UTRAN commands), including a control of high speed downlink packet access (HSDPA) and high speed uplink packet access (HSUPA) channels, and measurement reporting.

The RABM/PDCP 104 performs IP header compression in accordance with Internet Engineering Task Force (IETF) request for comments (RFC) 2507 and RFC 3095, lossless serving radio network controller (SRNC) relocation, management of NSAPI/packet data protocol (PDP) context mappings to radio access bearer (RAB) channels, including quality of service (QoS) management and RAB re-establishment, (i.e., RABM functions).

The BMC 106 performs delivery of cell broadcast messages to the non-access stratum (NAS) (i.e., upper layers), cell broadcast schedule evaluation, and configuration of cell broadcasting services (CBS) for discontinuous reception.

The RLC 108 performs translation of application data units, (i.e., service data units (SDUs)), between air interface efficient transport blocks, (i.e., protocol data units (PDUs)), in both the control and data planes, (i.e. segmentation and concatenation), network configurable retransmission, and ordered delivery of data units based on a specific mode, (i.e., an acknowledged mode (AM), unacknowledged mode (UM), and transparent mode (TM)).

The MAC 110 performs mapping of logical channels to transport channels, selecting the appropriate uplink transport format combinations based on instantaneous data rates within the WTRU, prioritization of transport channels within the WTRU, implementation of MAC-e/es protocols (HSUPA), and implementation of the MAC-hs protocols (HSPDA) including MAC-hs reordering queues, MAC-hs PDU multiplexing, or the like. Implementation of the MAC-e/es protocols includes processing of scheduling grants, buffer occupancy calculation, rate request mechanisms, transport formation combination (TFC) recovery and elimination, and MAC-e/es PDU construction.

A physical layer (PHY) 112 abstracts the specific implementation of the UMTS Layer 1 from the UMTS AS stack, allowing the stack to be easily ported to alternative UMTS Layer 1 implementations.

Conventional implementations of the protocol stack are all-software implementations running on standard processors and standard real-time operating systems. As wireless communication standards evolve to support ever higher data rates, the requirements placed on the protocol stack software increase. With the emergence of high data rate services, (such as HSDPA, HSUPA, mobile broadcast multicast services (MBMS)), implementation of the protocol stack in software on standard processors will require a significant amount of computing power. The power requirements of such standard processors become a prohibitive drain on the power consumption of the battery-powered devices and are not viable. Accordingly, it would be desirable to seek alternatives to implementation of the protocol stack.

SUMMARY

The present invention is related to a protocol engine (PE) for processing data within a protocol stack in a WTRU. The protocol stack executes decision and control operations. The data processing and re-formatting operation which was performed in a conventional protocol stack is removed from the protocol stack and performed by the PE. The protocol stack issues a control word for processing data and the PE processes the data based on the control word. Preferably, the WTRU includes a shared memory and a second memory. The shared memory is used as a data block place holder to transfer the data amongst processing entities. For transmit processing, the PE retrieves source data from the second memory and processes the data while moving the data to the shared memory based on the control word. For receive processing, the PE retrieves received data from the shared memory and processes it while moving the data to the second memory. As an alternative, two separate PEs, one for transmit processing and the other for receive processing may be used.

DETAILED DESCRIPTION OF THE PREFERRED EMBODIMENTS

When referred to hereafter, the terminology "WTRU" includes but is not limited to a user equipment (UE), a mobile station, a laptop, a personal data assistant (PDA), a fixed or mobile subscriber unit, a pager, a base station, a Node-B, a site controller, an access point or any other type of device capable of operating in a wireless environment.

The features of the present invention may be incorporated into an integrated circuit (IC) or be configured in a circuit comprising a multitude of interconnecting components.

In accordance with the present invention, a PE is provided within the protocol stack in a WTRU. Conventional protocol stack operations can be divided into two categories: 1) decision and control operations, and 2) data moving and re-formatting operations. Decision and control operations are involved in radio link maintenance, control and configuration. These operations are typically complex decision making processes and require significant flexibility in design and implementation. However, decision and control operations do not use significant processing power of standard processors. Data moving and re-formatting operations are involved in moving data between protocol stack components and re-formatting of data during the process. While the data moving and re-formatting operations are highly straightforward involving few decision points, these operations require significant processing power and the processing power increases as the data rate increases. The PE handles the data moving and re-formatting operations and those data moving and re-formatting operations are removed from the conventional protocol stack.

The PE is implemented by a simple, (low complexity, low power consumption), programmable processor that interprets headers of a received data packet on the receive side and generates headers of a transmit data packet on the transmit side. The PE is enhanced with instructions that optimize the extraction and insertion of bit fields from a stream of received or generated bits, which will be explained in detail hereinafter. The data stream is preferably maintained in a shared memory. The PE is an enhancement for controlling the datapath that is disclosed in a co-pending U.S. patent application Ser. No. 10/878,729 filed on Jun. 28, 2004, which is incorporated herein by reference.

Hereinafter, the UMTS AS will be used as an example. However, the present invention is applicable to any other protocol stack, including an AS in a network side, a non-access stratum (NAS) in the WTRU and the network side, as well as any other wireless communication standards including, but not limited to, global standards for mobile communication (GSM), global packet radio services (GPRS), enhanced data rate for GSM evolution (EDGE), CDMA2000 and IEEE 802.xx, or the like.

Figure 1:
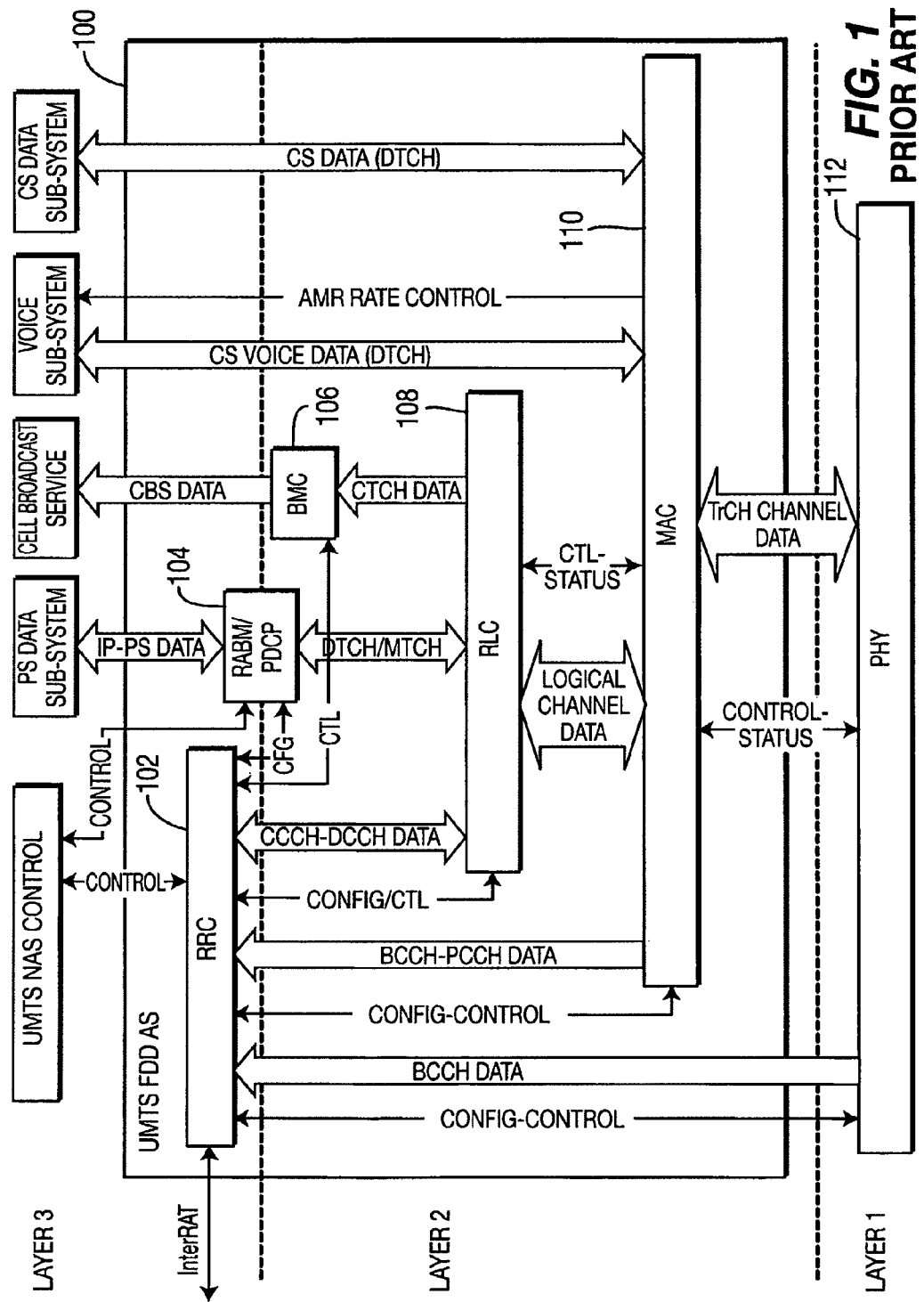
FIG. 1 shows a conventional UMTS AS protocol stack.
Figure 2:
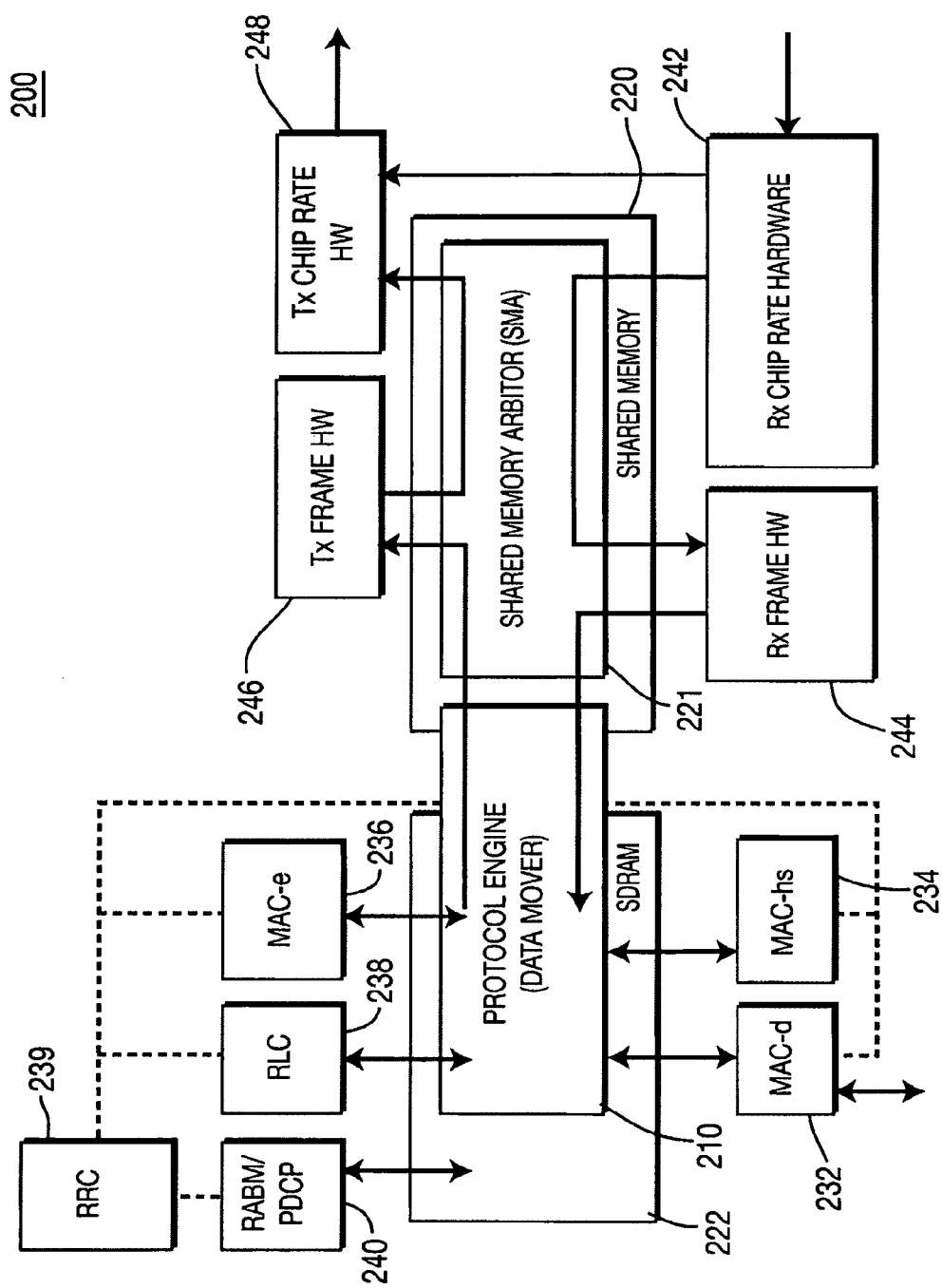
FIG. 2 is a block diagram of the overall system architecture of a WTRU including a PE in accordance with the present invention.

FIG. 2 is a block diagram of an overall system architecture of a WTRU 200 including a PE 210 in accordance with the present invention. The WTRU 200 preferably includes a shared memory 220 to reduce the number of memory instances. Numerous physical layer entities and processors access the shared memory 220 via a shared memory arbiter (SMA) 221 to use as a data block place holder to transfer data amongst the processing entities. By using a single shared memory 220, the die size of an application specific integrated circuit (ASIC) is reduced. Typically, a very fast memory, (such as a static random access memory (SRAM)) is used for the shared memory 220.

The WTRU 200 also includes a second memory 222 available to the processing entities, (such as MAC-d 232, MAC-hs 234, MAC-e 236, RLC 238 or RABM/PDCP 240), to store large amounts of data. The second memory 222 may be implemented by an external, commercially available dynamic random access memory (DRAM) or synchronous DRAM (SDRAM). For example, the second memory 222 may be used for reordering queues and other buffers for storage of data being processed for applications.

The PE 210, which may also be referred to as a data mover, is configured to move data between the shared memory 220 and the second memory 222 and re-format the data while moving the data. Data within the protocol stack is usually transferred in the form of a data packet, (i.e., an SDU or a PDU). The PDUs and SDUs include a header, a body and an optional padding. The header contains all the necessary information about the packet format. The padding is an optional field containing no data of value used to bring the packet length to some required length.

For transmitting a data packet, the protocol stack, (e.g., MAC-d 232, MAC-hs 234, MAC-e 236, RLC 238, RRC 239, or RABM/PDCP 240), sends a control word describing the requirements for data packet construction to the PE 210. The control word includes information for the PE 210 to determine (directly or via pointers) the location of source data in the second memory 222. The PE 210 retrieves the source data from the second memory 222 based on the control word and generates a PDU including a header, a body and padding (if necessary). The PE 210 then places the PDU in the shared memory 220 according to the control word. The PDU is then processed by a transmit frame hardware 246 and a transmit chip rate hardware 248 for transmission. Optionally, the PE 210 may be instructed to pad the packet with a specific data stream which is included in the control word either directly or indirectly (via a pointer). The optional padding may be watermarking information for security purposes.

For receiving a data packet, received data is processed by receive chip rate hardware 242 and receive frame hardware 244. The processed data, (i.e., a received packet), is placed in the shared memory 220. The PE 210 receives a control word from the protocol stack and retrieves the packet from the shared memory 220. The PE 210 extracts a header from the packet and interprets the header. The PE 210 then performs segmentation of the packet and generates, and places, an SDU in a location in the second memory according to a control word from the protocol stack. The header is passed to the protocol stack either as a whole or with information extracted from it as per the control word. The padding is discarded. Optionally, if other information (such as watermark information) is included in the padding, the padding would be extracted, either as is, or partially, and placed in the location of the memory specified in the control word.

Figure 3:
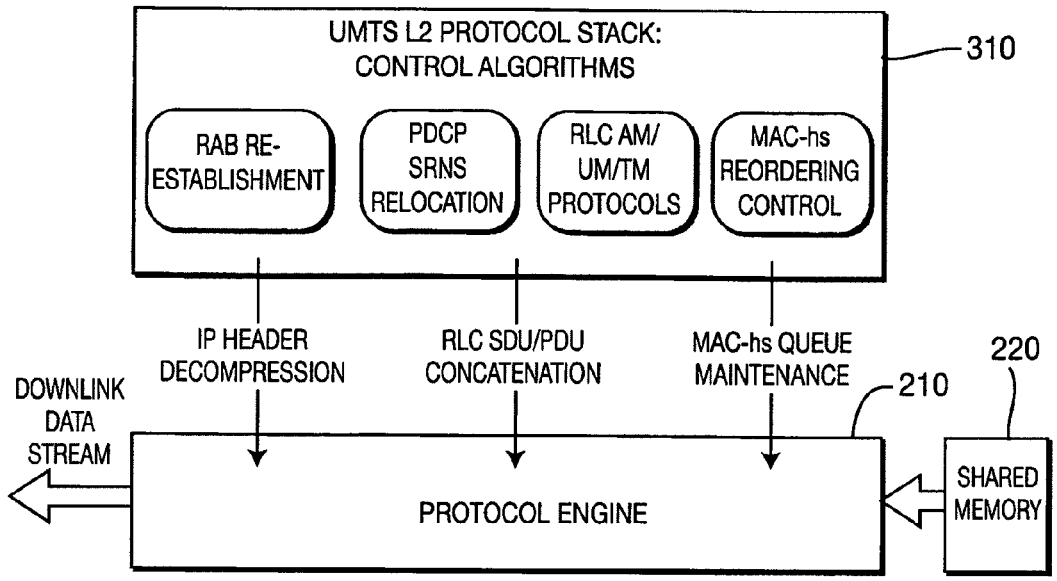
FIG. 3 shows an implementation of the PE in the downlink in accordance with the present invention.
Figure 4:
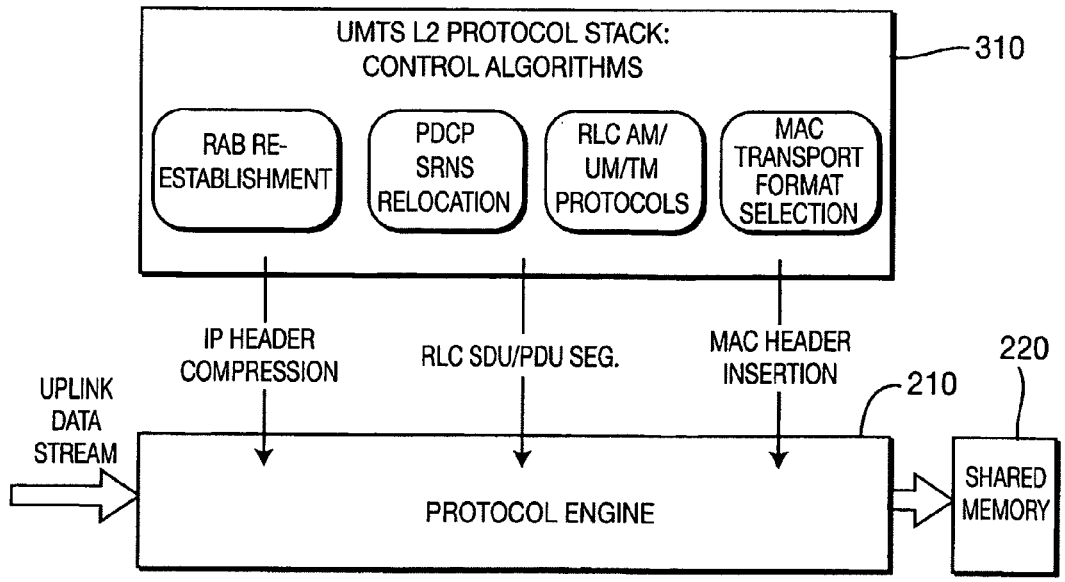
FIG. 4 shows an implementation of the PE in the uplink in accordance with the present invention.

FIGS. 3 and 4 show implementation of the PE 210 in the downlink and uplink, respectively, in accordance with the present invention. As stated above, the protocol stack 310 performs control operations and the PE 210 performs data processing and re-formatting operations. Control operations performed by the protocol stack 310 include, but are not limited to, RABM RAB establishment and maintenance, (i.e., tear-down and re-establishment of an RAB), PDCP SRNS relocation, RLC delivery protocols including in-sequence delivery (RLC AM and UM) and RLC PDU recovery protocols (RLC-AM), MAC TF selection (MAC-d, MAC-c, MAC-e/es), and MAC reordering queue processing (MAC-hs).

Data processing and re-formatting operations performed by the PE 210 include, but are not limited to, PDPC IP header compression and decompression, RLC SDU/PDU segmentation and concatenation, RLC header insertion, MAC header insertion (MAC-d, MAC-c, and MAC-e/es), RLC header extraction and interpretation, and MAC header extraction, interpolation and processing (MAC-d, MAC-c and MAC-hs).

As shown in FIGS. 3 and 4, the PE 210 performs data plane operations while moving data to and from the shared memory 220 in accordance with the control word from the protocol stack 310, (such as IP header compression/decompression, RLC SDU/PDU segmentation/concatenation, MAC header insertion/extraction, and MAC-hs queue maintenance, or the like). These operations will be described in greater detail with respect to FIGS. 5-10B.

Figure 5:
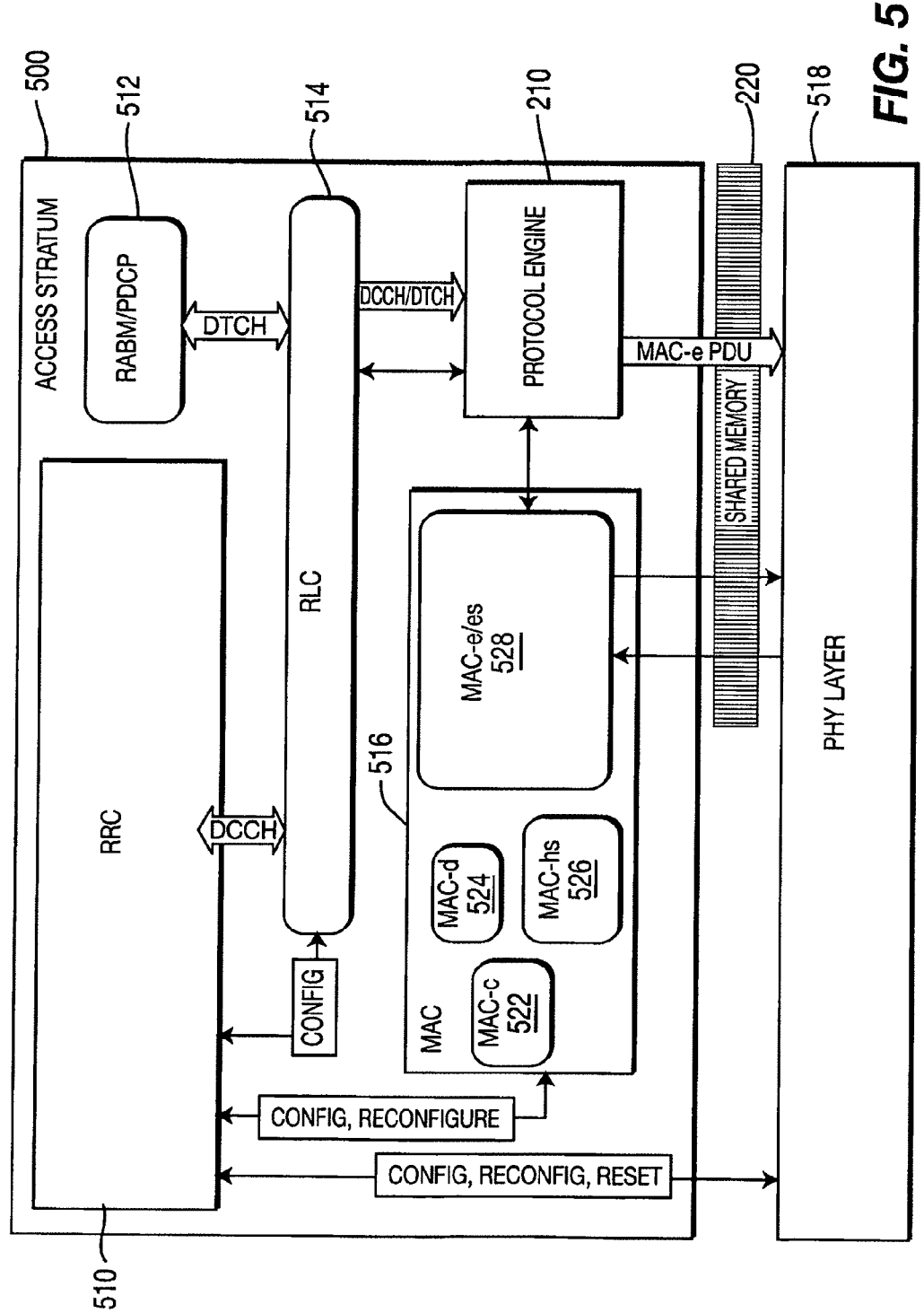
FIG. 5 is a block diagram of a UMTS AS protocol stack including a PE in accordance with the present invention.

FIG. 5 is a block diagram of a UMTS AS protocol stack 500 including a PE 210 in accordance with the present invention. The UMTS AS protocol stack 500 includes an RRC layer 510, an RABM/PDCP layer 512, an RLC layer 514, a MAC layer 516, and a PE 210. The MAC layer 516 includes MAC-c 522, MAC-d 524, MAC-hs 526 and MAC-e/es 528. FIG. 5 shows HSUPA operations with the PE 210 as an example. All HSUPA control functions are executed within the UMTS AS protocol stack 500, (i.e., the RRC layer 510, RABM/PDCP layer 512, RLC layer 514 and MAC layer 516), while data processing is performed by the PE 210.

The RRC 510 configures the RLC layer 514, the MAC layer 516 and the physical layer 518 by sending configuration, reconfiguration and reset signals. With respect to HSUPA, the RRC layer 510 processes HSUPA capability reporting from WTRUs, configures MAC-d flows over enhanced dedicated channel (E-DCH), controls HSUPA activation and deactivation, and configures physical channels and the MAC-e/es 528 for HSUPA.

The MAC-e/es 528 performs HSUPA scheduling and rate calculation, E-DCH transport format combination (E-TFC) restriction and selection, MAC-d flow multiplexing, or the like, and sends control parameters to the PE 210. The RLC 514 also sends control parameters to the PE 210 regarding in-sequence delivery and retransmission control.

Upon receipt of the control parameters from the MAC-e/es 528 and the RLC 514, the PE 210 processes the dedicated control channel (DCCH) data and dedicated traffic channel (DTCH) data received from the RLC 514. The processing includes RLC PDU construction of MAC SDUs from SDUs received from the RLC 514 via the DCCH and DTCH, (i.e., SDU to PDU segmentation and RLC header insertion), and construction of MAC-e/es PDUs from the MAC SDUs, (i.e., MAC-e/es header insertion), based on control parameters received from the MAC-e/es 528. The PE 210 also schedules PDU specific timers. The PE 210 generates the MAC-e/es PDUs and moves the MAC-e/es PDUs to the shared memory 220 for transmit processing by the physical layer 518.

Figure 6:
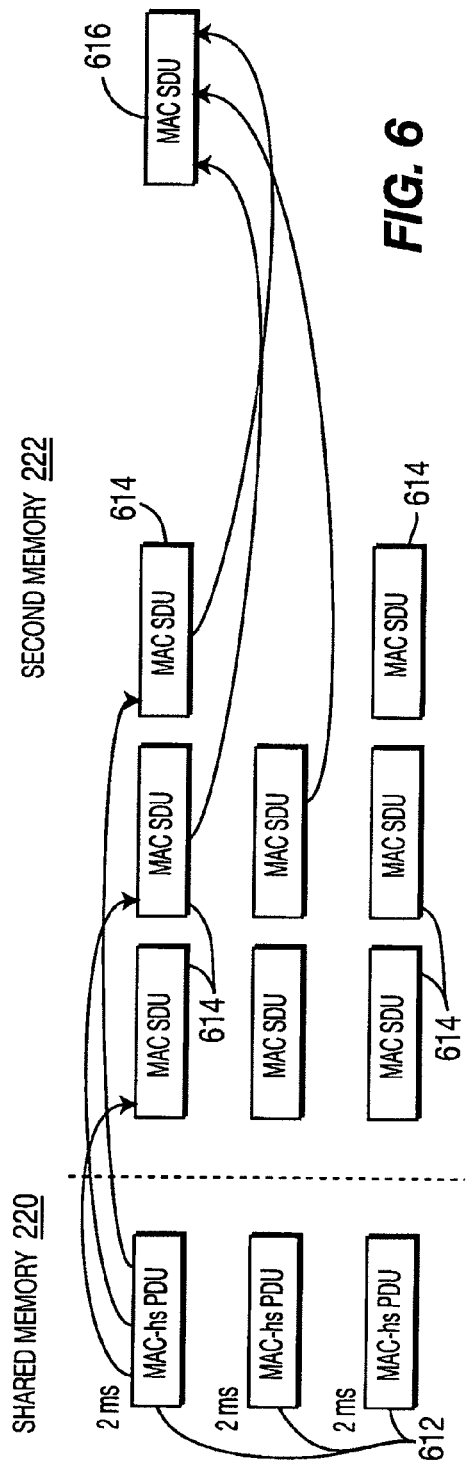
FIG. 6 shows a process for PDU decomposition in downlink processing in the PE in accordance with the present invention.

FIG. 6 shows a process for PDU decomposition for downlink processing in the PE 210 in accordance with the present invention. In the downlink processing, the PE 210 performs two operations: PDU decomposition and SDU generation. Received MAC-hs PDUs 612, (i.e., transport blocks), delivered from the physical layer via transport channels are placed in the shared memory 220. The HSDPA channel data is delivered every 2 ms while dedicated channel (DCH) data is delivered at 10 ms, 20 ms or 40 ms, intervals. The data stored in the shared memory 220 must be removed as quickly as possible to limit the size of the shared memory 220.

The PE 210 retrieves the MAC-hs PDUs 612 from the shared memory 220 and moves them to the second memory 222 while decomposing the MAC-hs PDUs 612 into a plurality of MAC SDUs 614. The protocol stack interprets the MAC-hs header and sets up the PE 210 per MAC SDU 614. The PE 210 may perform ciphering while moving the MAC-hs PDUs 612. After decomposition based on the control word, the PE 210 places the decomposed MAC SDUs 614 in the second memory 222 in locations designated by the control word. The MAC SDUs 614 may not have arrived in proper sequence. When enough contiguous MAC SDUs 614 have arrived, the PE 210 performs reordering of the MAC SDUs 614 and concatenates the MAC SDUs 614 into an SDU 616 and places the generated SDU 616 in a location of the second memory 222 according to the control word.

Figure 7:
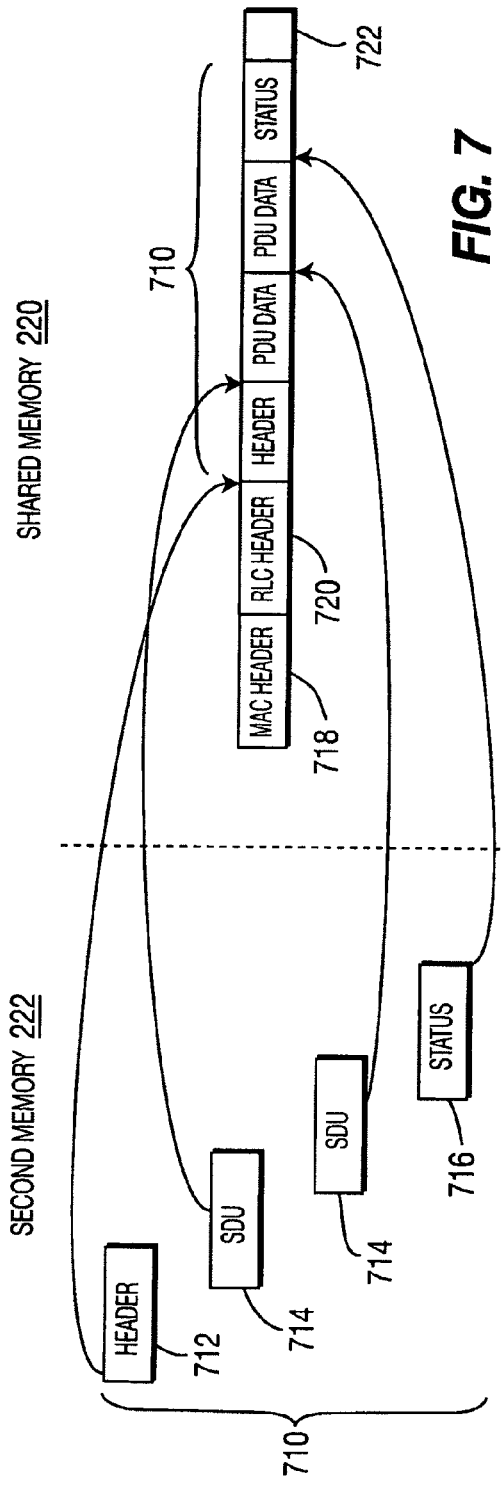
FIG. 7 shows a process for PDU generation in uplink processing in the PE in accordance with the present invention.

FIG. 7 shows a process for PDU generation for uplink processing in the PE 210 in accordance with the present invention. The protocol stack creates a MAC header 718 and an RLC header 720 and sends a control word to the PE 210, as shown in FIGS. 3 and 4. The control word contains necessary information for generating a MAC PDU 730 including a pointer to SDU data 710, (i.e., a header 712, SDUs 714, a status 716), in the second memory 222. The PE 210 gathers the SDU data 710 and generates a MAC PDU 730 by merging the SDU data 710, the MAC header 718, the RLC header 720 and padding 722, (if necessary). The PE 210 then places the generated MAC PDU 730 in the shared memory 220 according to the control word. The PE 210 may perform ciphering while generating the MAC PDU 730, if needed.

Figure 8:
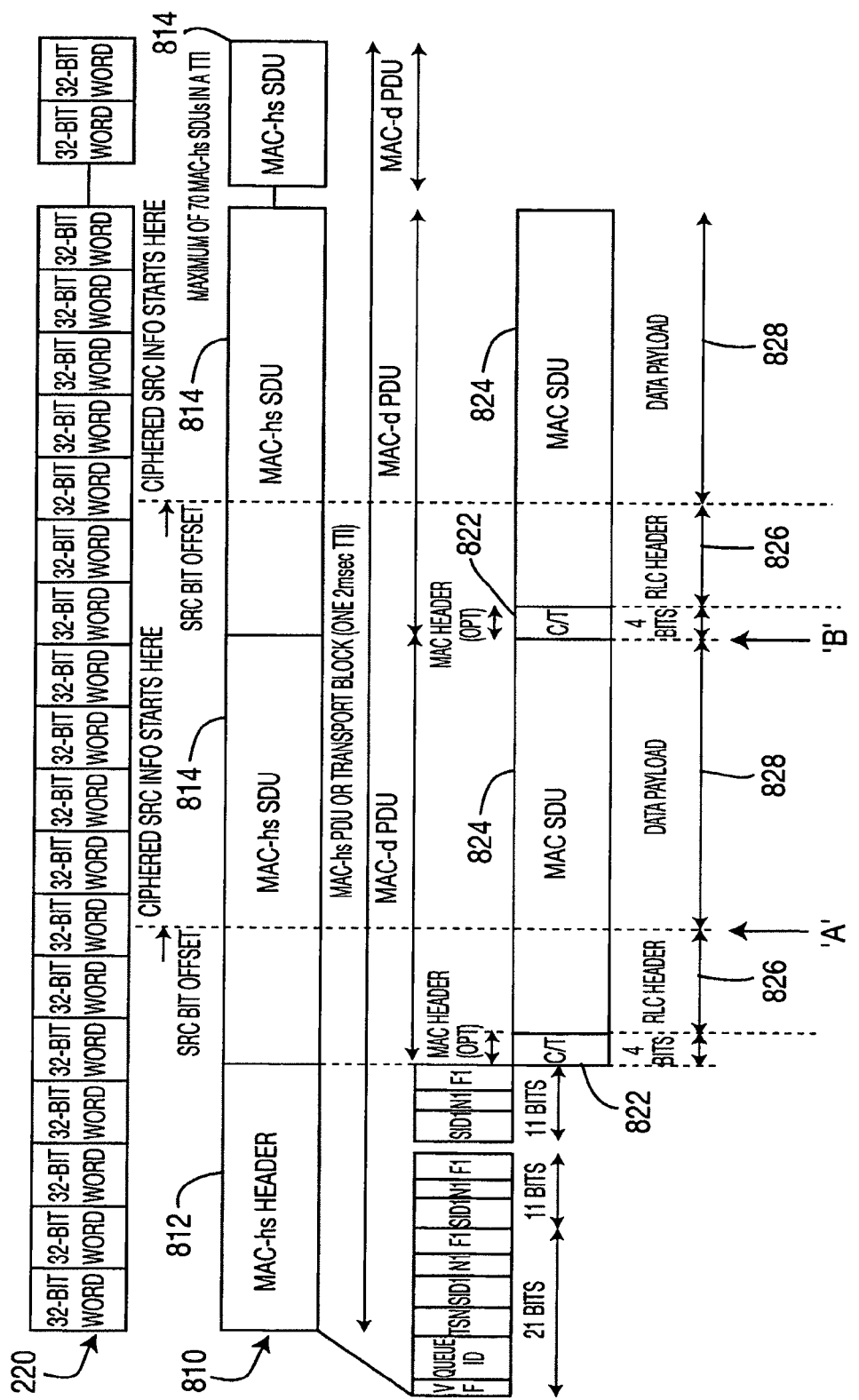
FIG. 8 shows a process for PDU decomposition in downlink processing in the PE in greater detail in accordance with the present invention.

FIG. 8 shows a process for PDU decomposition in downlink processing in the PE in a greater detail in accordance with the present invention. The top row represents the shared memory 220 having 32-bit words. The second row represents a MAC-hs PDU 810, (i.e., a transport block). The MAC-hs PDU 810 is placed in the shared memory 220 after physical layer processing. The MAC-hs PDU 810 includes a MAC-hs header 812 and a plurality of MAC-hs SDUs 814. Up to 70 MAC-hs SDUs 814 may be contained in a single MAC-hs PDU 810. Each MAC-hs SDU 814, which is a MAC-d PDU, includes a MAC header 822 (optional) and a MAC SDU 824. The MAC SDU 824 includes an RLC header 826 and a data payload 828. The MAC header 822 and the RLC header 826 include bit fields that need to be extracted. The PE 210 extracts the MAC-hs header 812, the MAC header 822 and the RLC header 826 from the shared memory 220 and moves the data payload 828 from the shared memory 220 to the second memory 222 while decomposing it into a plurality of MAC SDUs 814. Deciphering may be performed, if needed.

The data in the shared memory 220 is indicated by a stream pointer. The pointer is automatically updated after data extraction, moving or insertion operations. For example, before moving the data payload 828, the stream pointer indicates the location A in the shared memory 220. After the PE 210 moves the data payload 828 the stream pointer indicates the location B in the shared memory 220.

It should be noted that FIG. 8 illustrates downlink processing of HSDPA channel data as an example. However, the present invention is applicable to both the downlink and uplink and to any other type of channel data, such as dedicated channel data, HSUPA channel data, or the like.

Figure 9A:
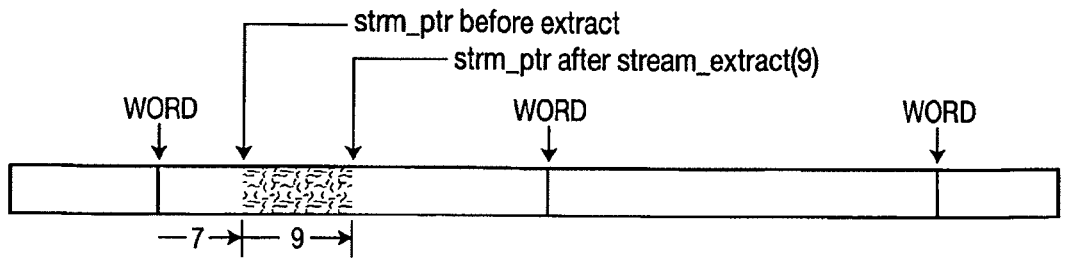
FIGS. 9A and 9B show operation of a stream extract function in accordance with the present invention.
Figure 9B:
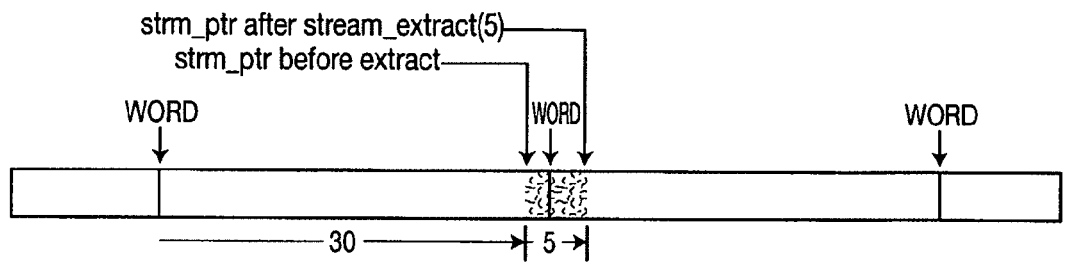

FIGS. 9A and 9B show an operation of a stream_extract (n) function in accordance with the present invention. After definition of "input stream pointer", the PE extracts 1 to 32 bits from an input stream and updates a stream pointer. FIG. 9A shows the case of 9-bit extraction from a single word, and FIG. 9B shows the case of 5-bit extraction from two words. The stream_extract (n) function returns 1 to 32 bits from the data stream in the shared memory.

Figure 10A:
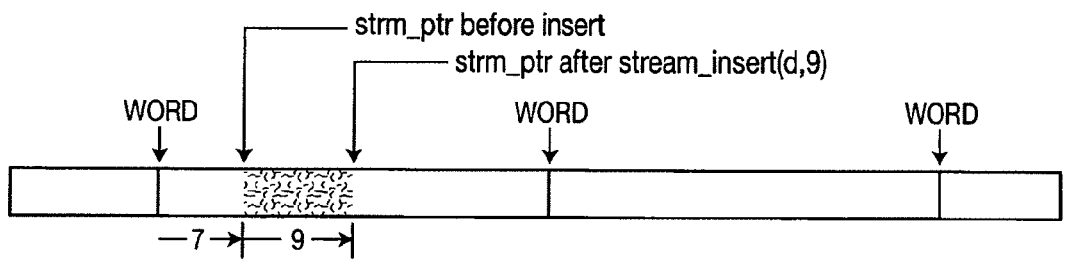
FIGS. 10A and 10B show operation of a stream insert function in accordance with the present invention.
Figure 10B:
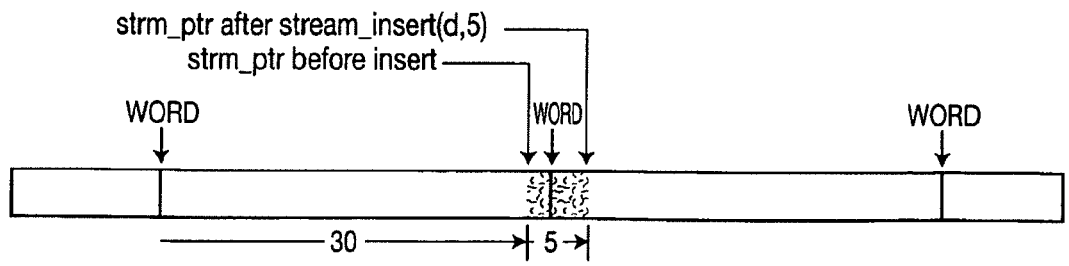

FIGS. 10A and 10B show an operation of a stream_insert (d,n) function in accordance with the present invention. After definition of "output stream pointer", the PE inserts 1 to 32 bits into an output stream and updates the stream pointer. FIG. 10A shows the case of 9-bit insertion in a single word, and FIG. 10B shows the case of 5-bit insertion over two words. The stream_insert (d,n) function inserts 1 to 32 bits to the data stream in the shared memory. The data stream is pointed by the pointer and the pointer is updated after insertion.

Figure 11:
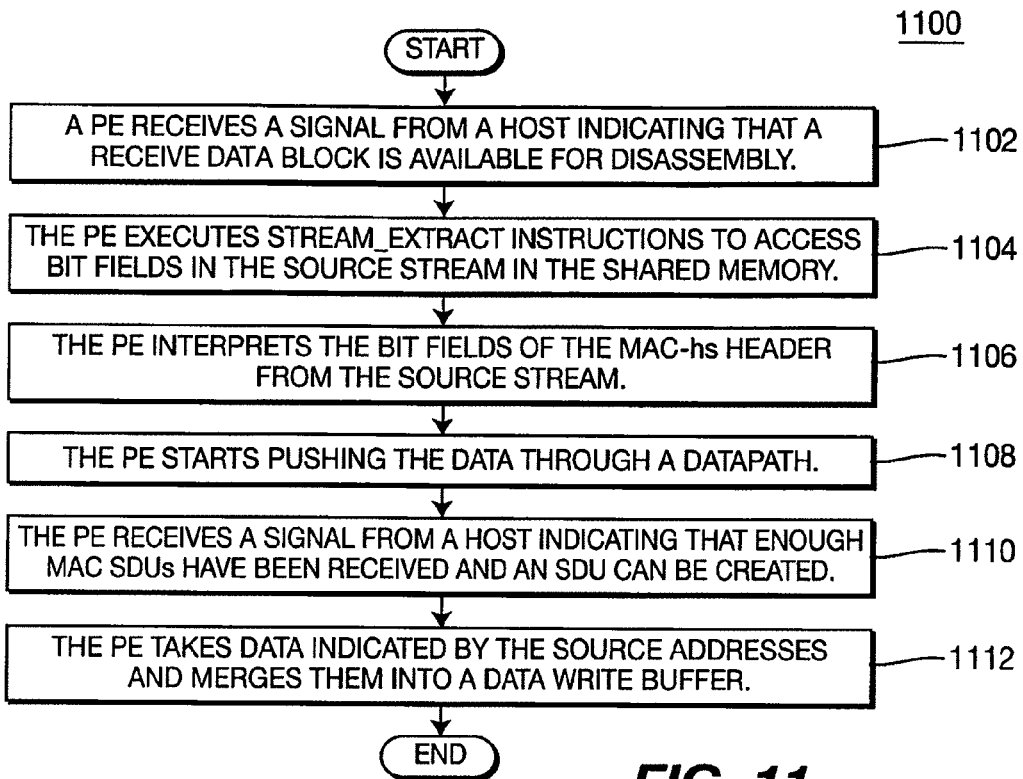
FIG. 11 is a flow diagram of a process for receive processing in accordance with the present invention.

FIG. 11 is a flow diagram of a process 1100 for receive processing in accordance with the present invention. The process 1100 is explained with reference to FIGS. 6, 8, 9A and 9B as well. The PE 210 receives a signal from a host indicating that a receive data block, (e.g., MAC-hs PDUs 612, 810), is available for disassembly (step 1102). The signal includes the address of the data block in the shared memory 220. The PE 210 executes stream_extract instructions to access bit fields in the source stream in the shared memory 220 (step 1104). Each stream_extract instruction returns the requested number of bits from the source stream into a specified register. The stream pointer is updated to point to the bit after the field that has just been extracted as shown in FIGS. 9A and 9B. The PE 210 interprets the bit fields of the MAC-hs header 812 from the source stream (step 1106). As the MAC-hs header 812 is interpreted, information about the MAC-hs SDUs 814 that will follow is collected.

When the MAC-hs header 812 has been read, the source stream pointer should be pointing at the first bit of the first MAC header 822. The PE 210 continues to extract, and interpret, the MAC header 822 and the RLC header 826 using the stream_extract instructions. When the RLC header 826 has been interpreted, the source stream pointer should be pointing at the first bit of the data payload 828 of the first MAC SDU 824.

The PE 210 is now ready to process the data payload 828. The PE 210 starts pushing the data 828 through a datapath, (i.e., generate MAC SDUs while moving the data payload 828 to the second memory 222), (step 1108). The data 828 may be pushed through a ciphering logic, if so configured. The resulting data is merged into a data write buffer and written to the appropriate destination address space in the second memory 222.

The PE 210 receives a signal from a host indicating that enough MAC SDUs 614, 824 have been received and an SDU 616 can be created (step 1110). The PE 210 accesses a control word created by the protocol stack, (i.e., L2/3), that identifies the source addresses of the blocks to be merged. Each address includes the starting bit address and a length in the second memory 222. The control word also includes a destination address in the second memory 222. The PE 210 takes data indicated by the source addresses and merges them into a data write buffer (step 1112). The merged data is then written to the appropriate destination address space in the second memory 222. The PE 210 continues to add data payload until all of the sources have been processed and the entire SDU 616 is created.

Figure 12:
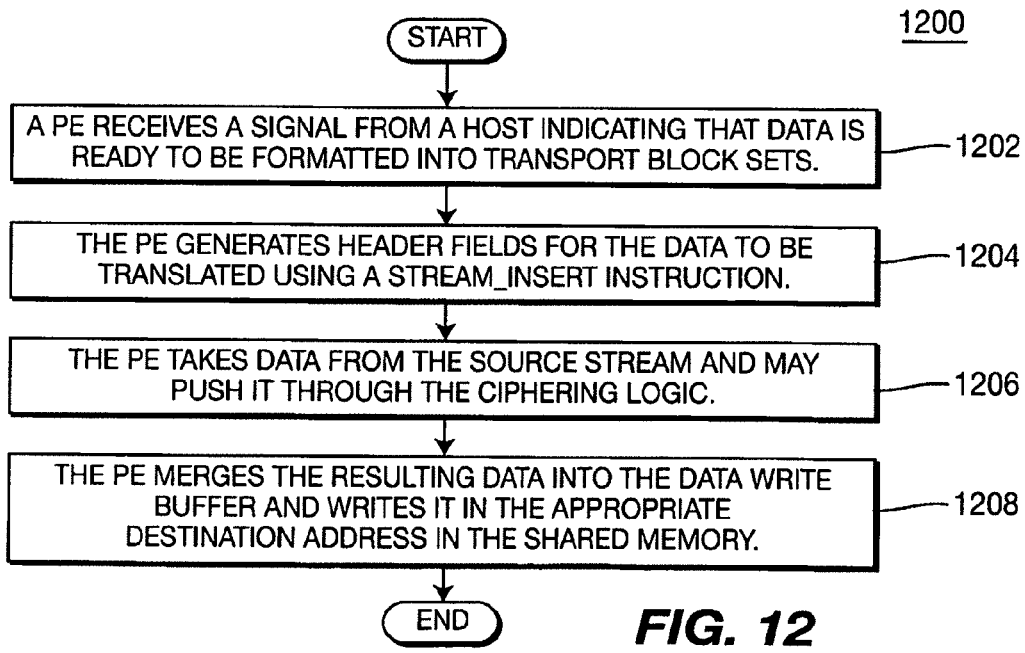
FIG. 12 is a flow diagram of a process for transmit processing in accordance with the present invention.

FIG. 12 is a flow diagram of a process 1200 for transmit processing in accordance with the present invention. The process 1200 is explained with reference to FIGS. 7, 8, 10A and 10B as well. The PE 210 receives a signal from a host indicating that data is ready to be formatted into transport block sets, (i.e., MAC PDUs) (step 1202). Using information from the protocol stack (L2/3), the PE 210 generates header fields, (i.e., MAC header 718 and RLC header 720), for the data to be translated (step 1204). For each field in the header, the PE 210 performs stream_insert instructions. The stream-insert instruction presents data and a bit length. Since the PE 210 is a programmable processor, it can keep track of block numbers, or the like using its own resources (e.g., registers, memory, or the like). The PE 210 performs appropriate shift and merge operations to place the specified number of bits into the outgoing bit stream. The PE 210 continues to use the stream_insert instructions until the complete headers are created. When the headers 718, 720 are complete, the outgoing stream pointer should be pointing to the next available bit position as shown in FIGS. 10A and 10B.

For the data payload, (i.e., SDU data 710), using information from L2/3, the PE 210 takes data from the source stream in the second memory 222 and, if so configured, may push it through the ciphering logic (step 1206). The PE 210 merges the resulting data into the data write buffer and writes it in the appropriate destination address in the shared memory 220 (step 1208). The PE 210 continues to add header information, (via stream_insert instructions), and add data payload until the entire packet 730 is created.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU), comprising:
a first memory;
a second memory;
a protocol stack processor including a medium access control (MAC) layer and a radio link control (RLC) layer and configured to issue a control word for processing data, wherein the control word includes instructions for reformatting the data while the data is transferred between the first memory and the second memory in the WTRU; and
a protocol engine configured to reformat the data while transferring the data between the first memory and the second memory according to the instructions included in the control word, wherein the protocol engine generates MAC protocol data units (PDUs) from RLC service data units (SDUs) for transmit processing based on the control word, and generates RLC SDUs from the MAC PDUs for receive processing based on the control word, wherein the protocol engine is configured to:
decompose a MAC PDU into a plurality of MAC SDUs;
concatenate a plurality of MAC SDUs to an SDU based on the control word;
gather SDU data, a MAC header, and an RLC header; and
generate a MAC PDU by merging two or more of the following: the SDU data, the MAC header, the RLC header, and padding.

2. The WTRU of claim 1, wherein the first memory is a shared memory shared by multiple processing entities.

3. The WTRU of claim 2, wherein the shared memory is a static random access memory.

4. The WTRU of claim 2, wherein the second memory is one of a dynamic random access memory (DRAM) and a synchronous DRAM.

5. The WTRU of claim 1, wherein the protocol engine is configured to perform at least one of: packet data convergence protocol Internet protocol header compression and decompression, RLC service data unit/protocol data unit segmentation and concatenation, RLC header insertion, MAC header insertion, RLC header extraction and interpretation, or MAC header extraction and interpolation.

6. The WTRU of claim 1, wherein the protocol engine is configured to generate a packet comprising a header, a body, and padding based on the control word.

7. The WTRU of claim 6, wherein the padding includes specific data.

8. The WTRU of claim 7, wherein the specific data is a watermark.

9. The WTRU of claim 1, wherein the protocol engine is configured to perform ciphering and deciphering of the extracted data.

10. In a wireless transmit/receive unit (WTRU) including a protocol stack processor and a protocol engine, a method for processing data in the WTRU, the method comprising:
receiving a control word from the protocol stack processor, wherein the protocol stack processor includes a medium access control (MAC) layer and a radio link control (RLC) layer and the control word includes instructions for reformatting the data while the data is transferred between a first memory and a second memory in the WTRU;
retrieving the data from the first memory or the second memory in accordance with the control word;
reformatting the data in accordance with the control word; and
storing the reformatted data in either the first memory or the second memory in accordance with the control word,
wherein the protocol engine generates MAC protocol data units (PDUs) from RLC service data units (SDUs) for transmit processing based on the control word, and generates RLC SDUs from the MAC PDUs for receive processing based on the control word,
wherein the protocol engine is configured to:
decompose a MAC PDU into a plurality of MAC SDUs;
concatenate a plurality of MAC SDUs to an SDU based on the control word;
gather SDU data, a MAC header, and an RLC header; and
generate a MAC PDU by merging two or more of the following: the SDU data, the MAC header, the RLC header, and padding.

11. The method of claim 10, wherein the first memory is a shared memory shared by multiple processing entities.

12. The method of claim 11, wherein the shared memory is a static random access memory.

13. The method of claim 11, wherein the second memory is one of a dynamic random access memory (DRAM) and a synchronous DRAM.

14. The method of claim 10, wherein the protocol engine is configured to perform at least one of: packet data convergence protocol Internet protocol header compression and decompression, RLC service data unit/protocol data unit segmentation and concatenation, RLC header insertion, MAC header insertion, RLC header extraction and interpretation, or MAC header extraction and interpolation.

15. The method of claim 1, wherein the protocol engine is configured to generate a packet comprising a header, a body, and padding based on the control word.

16. The method of claim 15, wherein the padding includes specific data.

17. The method of claim 16, wherein the specific data is a watermark.

18. The method of claim 10, further comprising:
performing ciphering and deciphering of the data.

* * * * *

UNITED STATES PATENT AND TRADEMARK OFFICE
CERTIFICATE OF CORRECTION

PATENT NO. : 8,699,434 B2  
APPLICATION NO. : 13/086630  
DATED : April 15, 2014  
INVENTOR(S) : Edward L. Hepler, Robert G. Gazda and Alexander Reznik It is certified that error appears in the above-identified patent and that said Letters Patent is hereby corrected as shown below:

ON THE TITLE PAGE

Item (75), Inventors: line 3 after "Alexander", delete "Reznick" and insert --Reznik--.

Signed and Sealed this  
Second Day of June, 2015

Michelle K. Lee  
*Director of the United States Patent and Trademark Office*